United States Patent Office 3,231,555
Patented Jan. 25, 1966

3,231,555
SOLID COPOLYMERS OF PERFLUORONITRO-
SOALKANE AND R—CH=CH₂
Robert Neville Haszeldine, Ronald Eric Banks, and Hayden Sutcliffe, Manchester, England, assignors to National Research Development Corporation, London, England, a corporation of Great Britain
No Drawing. Filed Jan. 8, 1962, Ser. No. 164,968
Claims priority, application Great Britain, Feb. 1, 1961, 3,783/61
6 Claims. (Cl. 260—92.1)

The present invention relates to polymeric organic compounds containing fluorine, oxygen and nitrogen and to methods for the preparation thereof.

Hitherto, it has been found that a perfluoronitrosoalkane compound will co-polymerise with a range of substituted ethylenes and particular highly fluorinated ethylenes to give 1:1 copolymers. Such polymers may be obtained in the form of mobile liquids, viscous oils or elastomers.

It has now been discovered that, when particular ethylenes are reacted with polyfluoronitroalkanes, entirely new and distinct polymers can be obtained.

According to the present invention, therefore, there is provided a copolymer of a perfluoronitroalkane and an olefin of structure RCH=CH₂ in which R represents hydrogen, a halogen atom or a phenyl group, the molar ratio of nitrosoalkane to olefin incorporated in the polymer being substantially 2 to 1.

The polymer will normally have a molecular weight in the range of from 500 to 2,000,000 the value being calculated by the viscosity method using a suitable solvent such as a ketone or low molecular weight fluoro-carbon. Preferred copolymers are those in which the perfluoronitrosoalkane contains a perfluoro lower alkyl group e.g. trifluoronitrosomethane and the olefin is ethylene, vinyl fluoride or styrene.

Further according to the invention, there is provided a process for the preparation of a co-polymer as hereinbefore defined comprising a perfluoronitrosoalkane with an olefin of structure RCH=CH₂, in which R represents hydrogen, a halogen atom or a phenyl group. The reaction is preferably carried out at a temperature in the range of about —40° C. to +150° C. and a pressure in the range of about 0.1 to 200 atmospheres. Within these ranges, the reaction is preferably performed at a temperature in the range of about 50 to 150° C. and a pressure in the range of 1 to 50 atmospheres. The length of the reaction time depends upon the reaction conditions and may be prolonged, e.g. of the order of six months.

Some copolymer is obtained whatever proportion of the two monomers is used, but for the preparation of a copolymer having a relatively high molecular weight the use of perfluoronitrosoalkane and olefin in a molar ratio of 2 to 1 is preferred.

The polymers of the invention are resinous solids and have useful properties. Thus, they have good chemical resistance and satisfactory thermal stability, making them useful in laminate mouldings. The hydrogen atoms of the ethylene or substituted ethylene can be replaced by other groups e.g. by reaction with a sulphonyl chloride, to form intermediates of use in the synthesis of other polymers. Moreover, the hydrogen atoms can be used as a site of attack for chemical dyeing so that coloured polymers may be obtained.

In the case where R represents a phenyl group, the polymers can be used as precursors of ion exchange resins.

The following examples illustrate the invention.

Example 1

A mixture of trifluoronitrosomethane (43 parts by wt.) and monofluoroethylene (19 parts) is maintained at 100° C. and a pressure of 8 atoms. for six months. A brown resinous polymer (12 parts) is obtained, empirical formula $C_4H_3O_2N_2F_7$, comprising the nitroso-compound and the olefin combined together in the molar ratio of 2:1.

Example 2

A mixture of trifluoronitrosomethane (39 parts) and ethylene (12 parts) is maintained at 100° C. and a pressure of 8 atoms for six months. A polymer (16 parts) is obtained as a brown resin having an empirical formula $C_4H_4O_2N_2F_6$.

Example 3

A mixture of trifluoronitrosomethane (19 parts) and styrene (20 parts) is retained at 20° C. and a pressure of 10 atoms for 15 hours. A white, crystalline solid polymer (7 parts) having an empirical formula $C_{10}H_8O_2N_2F_6$ is obtained together with a liquid polymer having an empirical formula $C_9H_8ONF_3$.

We claim:
1. A solid copolymer of a perfluoronitrosoalkane and a compound of structure RCH=CH₂, in which R is selected from the group consisting of hydrogen, a fluorine atom and a phenyl group, the molar ratio of nitroso-alkane to olefin incorporated into the polymer being substantially 2 to 1.

2. A solid copolymer according to claim 1 in which the molecular weight of the copolymer is in the range of 500 to 2,000,000.

3. A solid copolymer according to claim 1 in which the perfluoronitrosoalkane is perfluoronitrosomethane.

4. A solid copolymer of perfluoronitrosomethane and ethylene, the molar ratio of the nitrosomethane to the ethylene being substantially 2 to 1.

5. A solid copolymer of perfluoronitrosomethane and vinyl fluoride, the molar ratio of the nitrosomethane to the vinyl fluoride being substantially 2 to 1.

6. A solid copolymer of perfluoronitrosomethane and styrene, the molar ratio of the nitrosomethane to the styrene being substantially 2 to 1.

References Cited by the Examiner
UNITED STATES PATENTS 3,065,214   11/1962   Rose _____ 260—92.1
3,072,592   1/1963    Crawford _____ 260—92.1

OTHER REFERENCES

Barf et al., Journal of the Chemical Society, pages 1351–62 (London), March, 1961.

JOSEPH L. SCHOFER, Primary Examiner.

J. R. LIBERMAN, WILLIAM H. SHORT, Examiners.